(12) United States Patent  
Fecteau

(10) Patent No.: US 7,070,012 B2  
(45) Date of Patent: Jul. 4, 2006

(54) SNOWMOBILE SUSPENSION

(75) Inventor: Berthold Fecteau, Richmond (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/895,343

(22) Filed: Jul. 21, 2004

(65) Prior Publication Data

US 2005/0016784 A1    Jan. 27, 2005

Related U.S. Application Data

(60) Provisional application No. 60/488,437, filed on Jul. 21, 2003.

(51) Int. Cl.  
*B62M 27/02* (2006.01)

(52) U.S. Cl. .................. 180/9.5; 180/190; 305/128

(58) Field of Classification Search ............. 180/9.1, 180/9.5, 190; 305/128, 127  
See application file for complete search history.

(56) References Cited

U.S. PATENT DOCUMENTS

| | | | |
|---|---|---|---|
| 4,360,214 A | 11/1982 | Isono | |
| 5,727,643 A | 3/1998 | Kawano et al. | |
| 5,860,486 A * | 1/1999 | Boivin et al. | 180/193 |
| 5,904,216 A | 5/1999 | Furusawa | |
| 5,944,134 A * | 8/1999 | Peppel et al. | 180/193 |
| 6,206,124 B1 | 3/2001 | Mallette et al. | |
| 6,631,778 B1 * | 10/2003 | Mallette | 180/193 |
| 2004/0188160 A1 * | 9/2004 | Yoshihara | 180/190 |

* cited by examiner

*Primary Examiner*—Kevin Hurley  
(74) *Attorney, Agent, or Firm*—Osler, Hoskin & Harcourt LLP

(57) ABSTRACT

An improved rear suspension assembly is provided for snowmobiles, which includes a link assembly operatively connecting the rear suspension arm to a front cushion absorber so that the pivot movement of the rear suspension arm actuates the front shock absorber assembly. In one embodiment of the present invention, a rocker arm is pivotally attached to the slide frame assembly and has a front end thereof pivotally attached to the front shock absorber assembly, and has a rear end pivotally attached through a link rod to the rear suspension arm. The present invention advantageously improves the dynamic response of the rear suspension during snowmobile acceleration, and therefore prevents the skis of the snowmobile from lifting off from the ground.

20 Claims, 9 Drawing Sheets

SNOWMOBILE SUSPENSION

This application claims the benefit of U.S. Provisional Application No. 60/488,437 filed Jul. 21, 2003, the contents of which are incorporated herein by reference.

FIELD OF THE INVENTION

The present invention relates to suspension assemblies for tracked vehicles, and more particularly to rear suspension assemblies for snowmobiles.

BACKGROUND OF THE INVENTION

The dynamic response of a rear suspension assembly of a tracked vehicle such as a snowmobile, to the multitude of loads imposed upon it during operation, has a significant affect on the overall performance and rider comfort of the vehicle. Three types of loads are regularly exerted upon a tracked vehicle. The impact loads imposed upon the rear suspension as the vehicle travels rough terrain and encounters bumps are of the most concern. There are also internal forces developed during rapid acceleration, which causes a weight transfer from the front of the vehicle to the rear. This tends to lift the skis off the ground and thus interferes with steering. Furthermore, there are centrifugal forces imposed on the vehicle when the vehicle makes turns at high speeds. The complex interaction of the forces which occur in the rear suspension assembly during vigorous operation have demanded optimal design of mechanisms for absorbing and attenuating the complex combination of loads imposed upon a modern high performance snowmobile.

The fundamental structure of the rear suspension of a tracked vehicle such as a snowmobile has remained essentially constant for many years. Conventionally, the rear suspension supports the endless track, which is tensioned to surround a pair of parallel slide rails, a plurality of idler wheels and at least one drive wheel or sprocket. A shock absorbing mechanism involving compressed springs, hydraulic dampers, etc., urges the slide frame assembly and the chassis (also known as a frame) of the snowmobile apart, against the weight supported above the suspension in a static condition.

One example of a conventional rear suspension of a snowmobile is described in U.S. Pat. No. 5,727,643, issued to Kawano et al. on Mar. 17, 1998. Kawano et al. discloses a suspension device for providing a resilient support for a snowmobile body, including a frame for supporting the snowmobile body. A slide rail is operatively connected to the frame for pressing a crawler belt against a snow surface. A swing arm includes a first end pivotally supported on the frame and a second end pivotally mounted on the slide rail. A shock absorber assembly includes a first end pivotally supported on a shaft adjacent to the first end of the swing arm, a second end of the shock absorber assembly being connected to the frame through a progressive link pivotally supported on the swing arm.

Another example of a conventional rear suspension of a snowmobile is disclosed in U.S. Pat. No. 5,904,216, issued to Furusawa on May 18, 1999. Furusawa discloses a rear suspension of a snowmobile including two angular suspension arm assemblies, which connect the slide frame assembly to the snowmobile chassis. These suspension arm assemblies are moveable independently of one another in order to permit the slide frame assembly to accommodate itself to static and dynamic forces arising during operation. A single cushion unit extends horizontally and is operatively connected at opposed ends thereof to the respective suspension arm assemblies in order to support and attenuate the loads.

Irregularities in the terrain traveled by the snowmobile produce displacements and deflections of the front suspension that supports the vehicle on the skis, and of the rear suspension. Depending upon their magnitude, frequency and strength, these deflections cause more or less discomfort to the operator and passenger of the snowmobile. It has been recognized that suspension displacements that produce angular acceleration of the snowmobile and its operator about a transverse horizontal axis, produce more discomfort than displacements that merely produce vertical acceleration of the vehicle and its operator. Therefore, coupled suspension systems have been developed, in which the pivotal movement of the two suspension arm assemblies are coupled and the slide rails are thereby generally kept parallel to the vehicle so that the operator and passenger of the snowmobile are less affected by the uneven terrain.

Although conventional rear suspension systems available provide a relatively comfortable ride to the passengers, it is desirable to further improve the rear suspension assemblies for tracked vehicles, particularly snowmobiles.

SUMMARY OF THE INVENTION

One object of the present invention is to provide a rear suspension assembly for a tracked vehicle, such as a snowmobile, which includes a shock absorber assembly operatively connected to the rear suspension arm and is adapted to be actuated not only by the movement of the front portions of slide rails relative to the chassis but also actuated by the pivot movement of the rear suspension arm relative to the chassis.

In accordance with one aspect of the present invention, a suspension assembly for mounting an endless track to a chassis of a tracked vehicle is provided. The suspension assembly comprises a slide frame assembly, a front suspension arm and a rear suspension arm. The front suspension arm is operatively attached at a lower end thereof to the slide frame assembly, and is pivotally attached at an upper end thereof to the chassis. The rear suspension arm is operatively attached at a lower end thereof to the slide frame assembly, and is pivotally attached at an upper end thereof to the chassis. A first shock absorber assembly is operatively attached at an upper end thereof to the chassis, and is operatively attached to both the slide frame assembly and the rear suspension arm through a link assembly such that the pivot movement of the rear suspension arm relative to the chassis actuates the first shock absorber assembly.

In accordance with another aspect of the present invention, there is provided a snowmobile suspension assembly which comprises a slide frame assembly on downwardly and rearwardly angled front and rear suspension arms that are pivotally supported in a chassis. The slide frame assembly is urged downwardly into contact with a ground-engaging portion of a snowmobile endless drive track. A rear shock absorber assembly is operatively attached to the suspension assembly for absorbing impact forces applied to the slide frame assembly. A front shock absorber assembly is operatively attached at a first end thereof to the front suspension arm, and is operatively attached at a second end thereof to the rear suspension arm. Thus, the pivotal movement of the first and second suspension arms relative to the chassis actuates the first shock absorber assembly.

In accordance with a further aspect of the present invention, there is provided a snowmobile which comprises a chassis including a tunnel at a rear portion thereof; a pair of skis operatively attached to the chassis at a front portion thereof for steering the snowmobile; an engine attached to the chassis; and an endless drive track disposed below the tunnel and operatively connected to the engine; and a rear suspension assembly for supporting and tensioning the endless drive track. The rear suspension assembly includes a pair of slide rails contacting a ground-engaging portion of the endless drive track. A front suspension arm is operatively attached at a lower end thereof to the slide rails, and is operatively attached at an upper end thereof to the tunnel. A rear suspension arm is operatively attached at a lower end thereof to the slide rails, and is operatively attached at an upper end thereof to the tunnel. There is provided a first shock absorber assembly operatively attached at an upper end thereof to the chassis, and operatively attached at the lower end to both the slide rails and the rear suspension arm through a link assembly. Thus, the pivotal movement of the rear suspension arm relative to the tunnel, actuates the first shock absorber assembly.

In one embodiment of the present invention a rocker arm is provided to operatively connect the first or front shock absorber assembly to the rear suspension arm. The rocker arm includes a front end, a rear end and a middle portion disposed therebetween. The rocker arm is preferably pivotally attached at its middle portion to the slide frame assembly, and the front end thereof is pivotally connected to the lower end of the first or front shock absorber assembly which in turn is operatively attached at the upper end thereof to the chassis. The rear end of the rocker arm is operatively connected to the upper end of the rear suspension arm, preferably through a link rod.

It is preferable to include a second or rear shock absorber assembly in the snowmobile suspension assembly. The lower ends of both the link rod and the second or rear shock absorber assembly are pivotally connected to the rear end of the rocker arm. A rear bracket which is affixed to the upper end of the rear suspension arm and is adapted to pivot together with the rear suspension arm relative to the chassis, is provided to pivotally connect, at different locations of the rear bracket, the upper ends of the respective link rod and the second or rear shock absorber assembly. Thus, the first or front shock absorber assembly is actuated not only by the movement of the front portion of the slide frame assembly relative to the chassis, but also actuated by the pivotal movement of the rear suspension arm relative to the chassis.

The suspension assembly of the present invention advantageously provides the first or front shock absorber assembly in an operation condition with a rising rate so that in most instances the first or front shock absorber assembly will be absorbing large impacts without having the compression stroke thereof bottom out. This is desirable, particularly for the front shock absorber assembly which extends across the limited space between the slide frame assembly and the tunnel, and thus usually has a limited stroke distance.

The suspension assembly of the present invention will further improve the dynamic feature thereof when the vehicle is in acceleration. It is known that during acceleration the tension in the track pulls the rear ends of the slide rails up towards the tunnel and pushes the front ends of the slide rails onto the ground, which transfers the weight of the vehicle to the rear thereof and tends to lift the skis off the ground. In the conventional snowmobile suspension assemblies the first or front shock absorber assembly pushes the front portions of the slide rails away from the tunnel during acceleration so that the undesirable condition is aggravated. With the suspension assembly of the present invention, testing has shown that the first or front shock absorber assembly is substantially unloaded during acceleration, which allows the front ends of the slide rails to move up towards the tunnel. Therefore, less weight is transferred to the rear of the vehicle and less weight is removed from the skis so that the skis are prevented from lifting off the ground during acceleration.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 1:
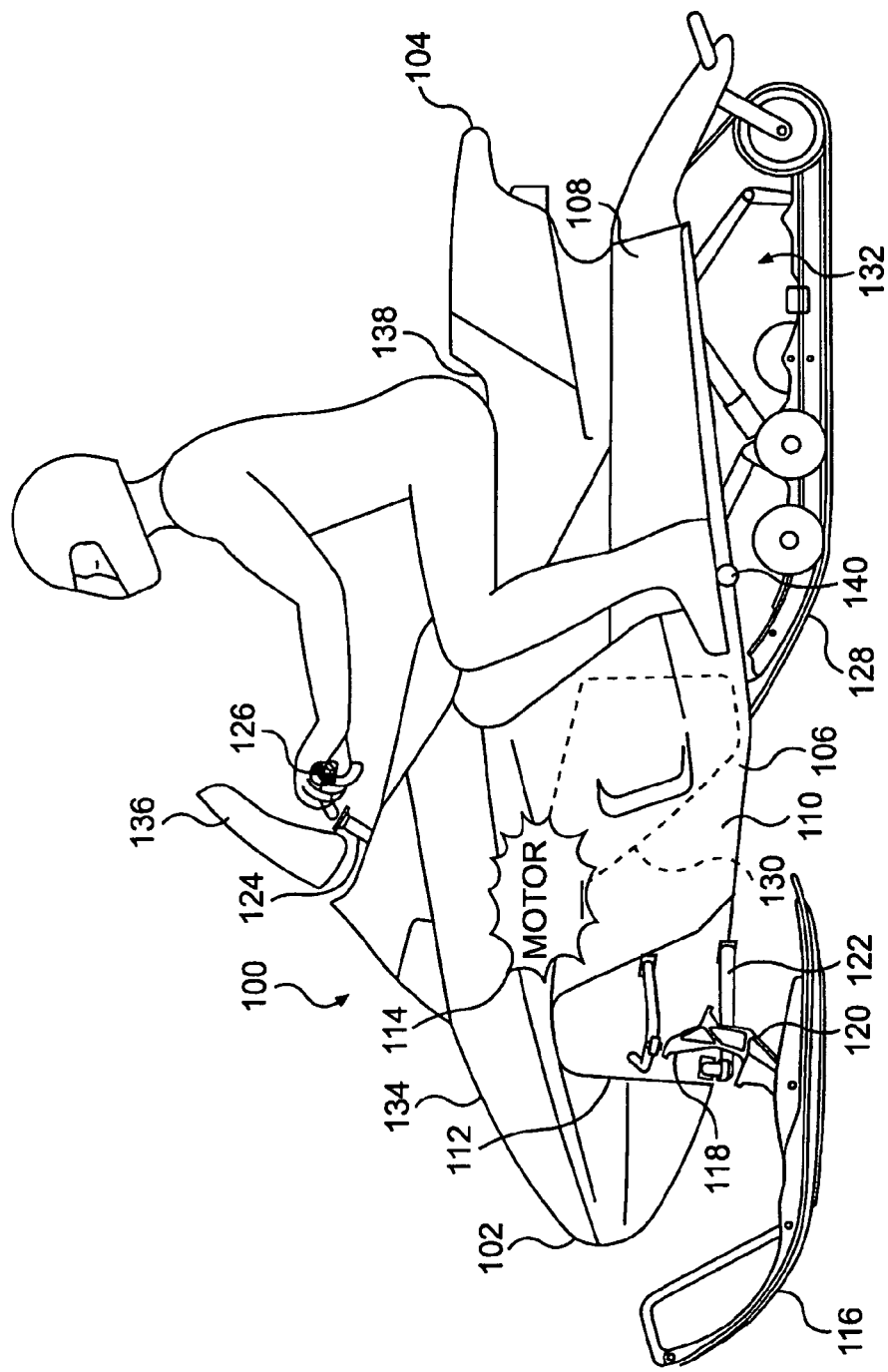
FIG. 1 is a schematic side view of a snowmobile incorporating one embodiment of the present invention.
Figure 2:
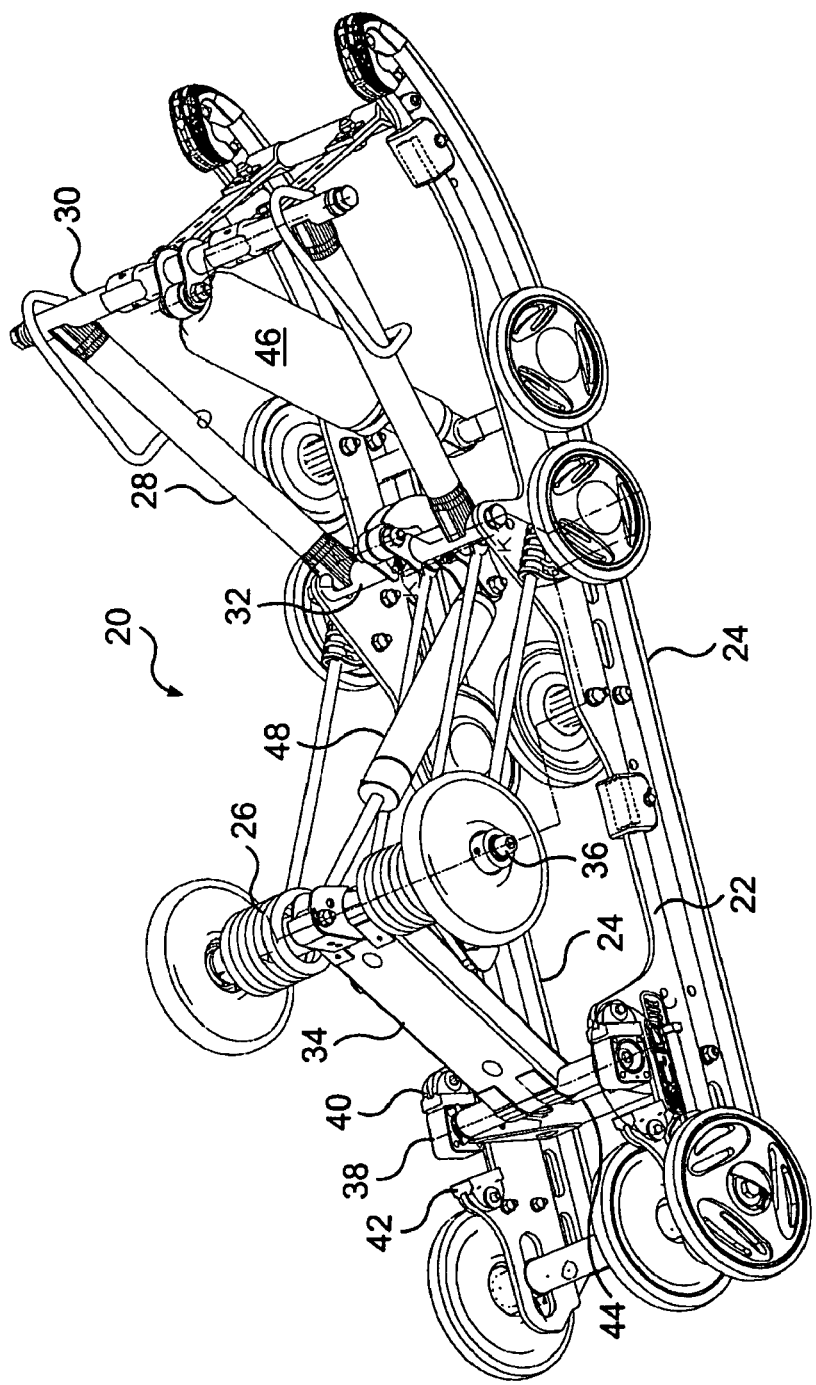
FIG. 2 is a perspective view of a conventional rear suspension assembly of a snowmobile in which the front shock absorber assembly is operatively connected between the chassis and the slide frame assembly without linkage to the rear suspension arm.

Referring now in detail to the drawings, and primarily to FIG. 1, a snowmobile incorporating the present invention is identified generally by the reference numeral 100.

The snowmobile 100 includes a forward end 102 and a rearward end 104, which are defined consistently with the forward travel direction of the vehicle. The snowmobile 100 includes a chassis 106 which normally includes a rear tunnel 108, an engine cradle portion 110 and a front suspension assembly portion 112. An engine 114 which is schematically illustrated, is carried by the engine cradle portion 110 of the chassis 106. A ski and steering assembly (not indicated) is provided, in which two skis 116 (only one is shown) are positioned at the forward end 102 of the snowmobile 100, and are attached to the front suspension assembly portion 112 of the chassis 106 through a front suspension assembly 118. The front suspension assembly 118 includes ski legs 120, supporting arms 122 and ball joints (not shown) for operatively joining the respective ski legs 120, supporting arms 122 and a steering column 124. The steering column 124 at its upper end is attached to a steering device such as a handlebar 126 which is positioned forward of a rider and behind the engine 114 to rotate the ski legs 120 and thus the skis 116, in order to steer the vehicle.

An endless drive track 128 is positioned at the rear end 104 of the snowmobile 100 and is disposed under tunnel 108, being connected operatively to the engine 114 through a belt transmission system 130 which is schematically illustrated by broken lines. Thus, the endless drive track 128 is driven to run about a rear suspension assembly 132 for propulsion of the snowmobile 100. The rear suspension assembly 132 is the subject matter of the present invention and will be described in detail with reference to the other figures of the drawings hereinafter.

At the front end 102 of the snowmobile 100, there are provided fairings 134 that enclose the engine 114 and the belt transmission system 130, thereby providing an external shell that not only protects the engine 114 and the belt transmission system 130, but can also be decorated to make the snowmobile 100 more aesthetically pleasing. Typically, the fairings 134 include a hood (not indicated) and one or more side panels (not indicated) which are both openable to allow for access to the engine 114 and the belt transmission system 130 when this is required, for example for inspection or maintenance of the engine 114 and/or the belt transmission system 130. A windshield 136 may be connected to the fairings 134 near the front end 102 of the snowmobile 100, or may be attached directly to the handlebar 126. The windshield 136 acts as a windscreen to lessen the force of the air on the rider while the snowmobile 100 is moving.

A seat 138 extends from the rear end 104 of the snowmobile 100 to the fairings 134. A rear portion of the seat 138 may include a storage compartment, or may be used to accept a passenger seat (not indicated). Two foot rests 140 only (only one shown) are positioned on opposed sides of the snowmobile 100 below the seat 138 to accommodate the rider's feet.

Referring to FIGS. 3–7, the endless drive track 128 is engaged with and driven by a drive sprocket 142 which is journaled by the rear tunnel 108 and is driven by the engine 114 through the belt transmission system 130 of FIG. 1. The endless drive track 128 is suspended for movement relative to the chassis 106, by the rear suspension assembly 132. The rear suspension assembly 132 includes a slide frame assembly 144 which primarily includes a pair of spaced apart slide rails 146 that engage the back side of the ground-engaging portion of the endless drive track 128.

The slide frame assembly 144 journals a plurality of backup rollers 148 (see FIGS. 6 and 7) and a larger, idler roller 150. In addition, further rollers 152 are carried by the rear tunnel 108, in order to define the path over which the endless drive track 128 travels.

A pair of downwardly and rearwardly angled front suspension arms 154 are pivotally attached at the upper ends thereof to the rear tunnel 108 by means of a tube and shaft assembly (not indicated). The tube and shaft assembly includes a tube 156 rotatably supported by a shaft 158 which extends laterally with respect to the rear tunnel 108 and through the tube 156, and is supported at the opposed ends thereof by the rear tunnel 108. The upper ends of the front suspension arms 154 are both affixed, preferably by welding, to the tube 156 so that the two front suspension arms 154 are adapted to pivot about the shaft 158. The lower ends of the front suspension arms 154 are pivotally attached to the respective slide rails 146 of the slide frame assembly 144 by means of a pivot pin assembly 160. Thus, the movement of the front portions of the slide rails 146 relative to the rear tunnel 108 of the chassis 106 causes the front suspension arms 154 to rotate together with the tube 156 about the shaft 158, relative to the rear tunnel 108.

The front suspension arms 154 in this embodiment are made of tubular metal and the attachment thereof to the tube 156 are preferably reinforced by triangular plates 162 (See FIG. 7) which are preferably welded to both the tube 156 and the front suspension arms 154.

A rear suspension arm 164 which is preferably made of a hollow metal configuration having a substantially consistent rectangular cross section, is downwardly and rearwardly angled and is disposed behind the front suspension arms 154. The rear suspension arm 164 is pivotally attached to the rear tunnel 108 of the chassis 106 by means of a tube and shaft assembly (not indicated).

The tube and shaft assembly includes a tube 166 rotatably supported by a shaft 168 which is substantially parallel to the shaft 158 and is mounted at the opposed ends thereof to the rear tunnel 108. The upper end of the rear suspension arm 164 is affixed by for example, welding to the tube 166 so that the rear suspension arm 164 is adapted to pivot about the shaft 168.

The lower end of the rear suspension arm 164 is pivotally connected to a pair of rear rocker arms 174 by means of a hollow cross bar 172. The rear rocker arms 174 flank the rear suspension arm 164 and are in turn pivotally attached to a rear portion of the respective slide rails 146. A pair of blocks 170 are attached to the opposed ends of the hollow cross bar 172. Rear stoppers 176 are attached to the respective slide rails 146, positioned rearward of the rear rocker arms 174 to limit the pivot movement of the rear rocker arms 174 in the clockwise direction. Each of the rear stoppers 176 is mounted to, for example, a bracket (not indicated) that is in turn mounted to slide frame assembly 144. The rear stoppers 176 can alternatively be the integral extensions of the slider frame assembly 144 themselves. The blocks 170 are fastened to a shaft 178 which rotates within the hollow cross bar 172 and is fastened at its opposed ends to the rear rocker 174. The blocks 170 are preferably made of elastomer, such as rubber, polyurethane resin, delrin, nylon or aluminum could also be used for the blocks.

In order to attenuate the impact loads generated when the blocks 170 collide with the rear stoppers 176, the rear stoppers can be made of or coated with a resilient material such as rubber or a polymer. Such a resilient material used on the stoppers 176 also help to reduce wear of the blocks 170.

In operation the rear suspension arm 164 is coupled to the front suspension arms 154 such that when the rear portions of the slide rails 146 are under impact forces and are pushed towards the rear tunnel 108 of the chassis 106, the front portion of the slide rails 146 will also be pushed towards the rear tunnel 108 because the clockwise rotation of the rear rocker arms 174 about the cross bar 175 is limited by the rear stoppers 176. A front shock absorber assembly 180 is disposed between the rear tunnel 108 and the slide frame assembly 144, located at front portions of the slide rails 146. The front shock absorber assembly 180 is a damping unit which usually includes a hydraulic damper and a coil spring for absorbing the impact energy when impact forces are applied to the opposite ends of the damping unit. The coil spring pushes the damping unit to extend so that the hydraulic damper is in the best position to absorb the impact energies. The shock absorber assembly 180 is well known in the art and will not be further described herein.

The front shock absorber assembly 180 is operatively attached at an upper end thereof to the rear tunnel 108 of the chassis, by means of a front bracket 182. The front bracket 182 is affixed, preferably by welding, to the tube 156 and is thereby adapted to pivot about the shaft 158 together with the front suspension arms 154, with respect to the rear tunnel 108. The upper end of the front shock absorber assembly 180 is pivotally connected to the front bracket 182 such that the axial force will be applied to the upper end of the front shock absorber assembly 180 when the front suspension arms 154 pivot. However, it is not necessary to attach the front shock absorber assembly 180 to the front suspension arms 154 in order to practice the present invention.

The front shock absorber assembly 180 is operatively attached at a lower end thereof to the slide frame assembly 144 by means of a front rocker arm 184. The front rocker arm 184 is a v-shaped bracket and is pivotally attached at its middle portion to the slide frame assembly 144 by means of a cross bar 186 which extends between, and is attached at its opposed ends to the two slide rails 146.

The front rocker arm 184 further includes a front end which is pivotally connected to the lower end of the front shock absorber assembly 180, and a rear end which is operatively attached to the rear suspension arm 164, via a link rod 188 and a rear bracket 190. The rear bracket 190 is affixed, preferably by welding to the tube 166 (more clearly shown in FIG. 4) and is thereby adapted to pivot about the shaft 168 together with the rear suspension arm 164, with respect to the rear tunnel 108 of the chassis 106. The two link rods 188 are disposed in a parallel relationship, and are pivotally connected at their rear ends to the rear bracket 190 by means of a pin 192, and are pivotally connected at their front ends to the rear end of the front rocker arm 184 by means 194 (more clearly shown in FIG. 5).

Therefore, the front rocker arm 184, the parallel link rods 188 and the rear bracket 190 form a link assembly through which the pivot movement of the rear suspension arm 164 about the shaft 168 and relative to the rear tunnel 108 of the chassis 106, causes a pivot movement of the front rocker arm 184 about the cross bar 186 to actuate the front shock absorber assembly 180, thereby applying an axial force to the lower end of the front shock absorber assembly 180.

Figure 5:
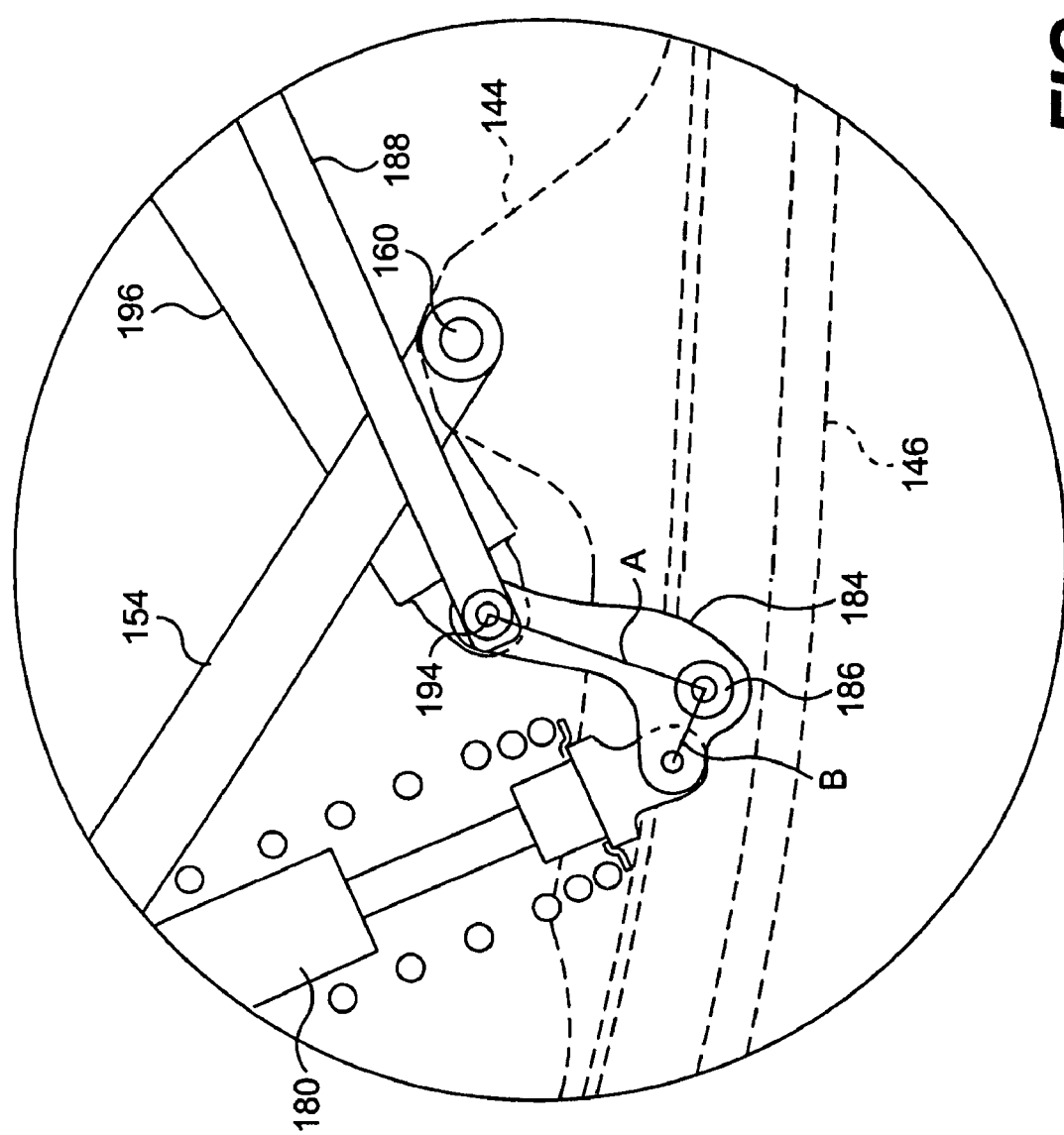
FIG. 5 is a further enlarged portion of FIG. 4, showing the details of the rocker arm of the link assembly used in the embodiment of FIG. 3.
Figure 6:
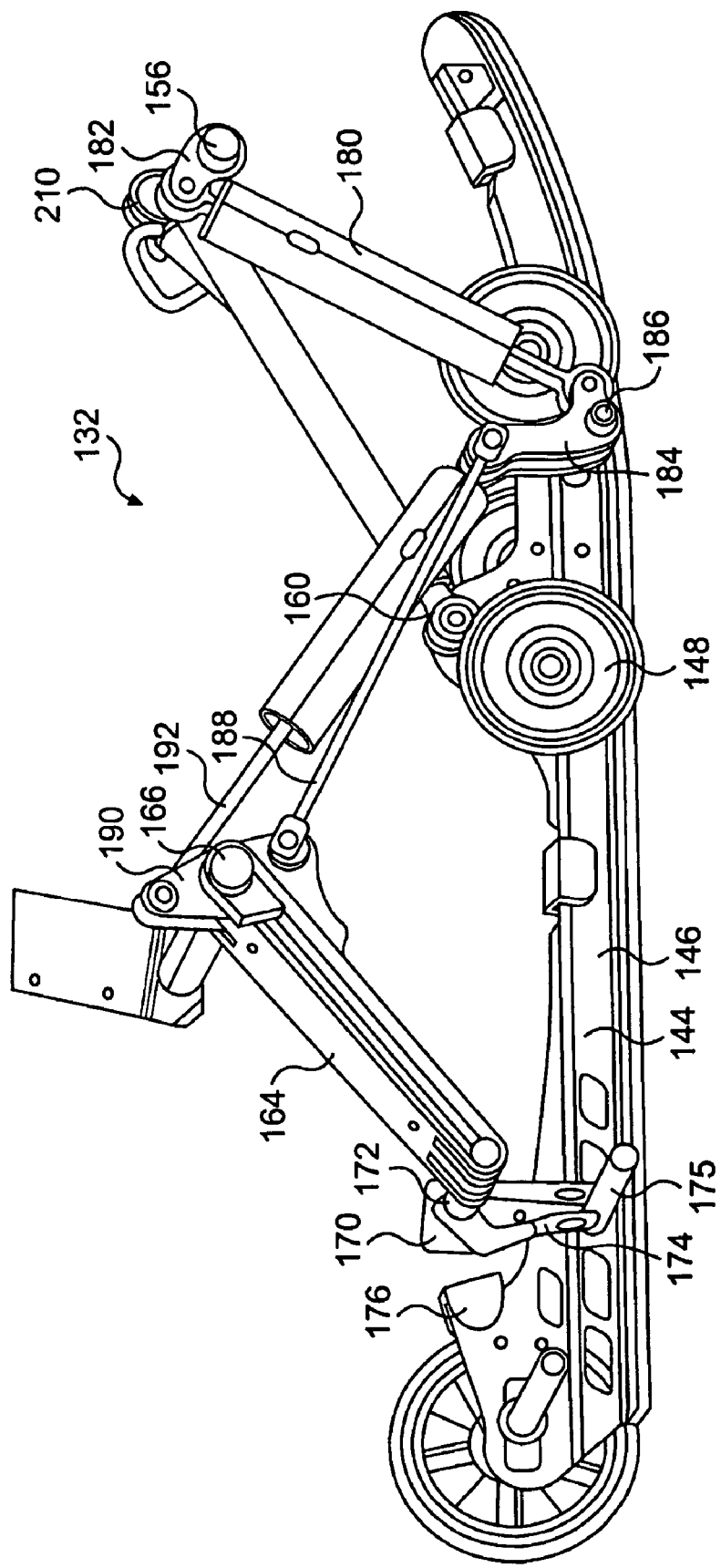
FIG. 6 is a partial rear, side perspective view of the rear suspension assembly of FIG. 3, showing the left side of the suspension assembly that has been cut down the middle.

It should be noted that Distance A between the rear end of the front rocker arm 184 and the pivot attachment location where the cross bar 186 is located, at the middle portion thereof is preferably longer than Distance B between the front end of the rocker arm 184 and that pivotal attachment location at the middle portion of the rocker arm 184 (See FIG. 5).

Although not required in order to practice the present invention, it is preferable to further provide a rear shock absorber assembly 196 which is disposed between the parallel link rods 188 for packing reasons. The rear shock absorber assembly 196, is pivotally connected at its upper end to the rear bracket 190 by means of a pin 198 (more clearly shown in FIG. 4), and is pivotally connected at its lower end to the rear end of the front rocker arm 184 by the pin 194 which also pivotally connects the link rods 188 to the front rocker arms 184. The rear shock absorber assembly 196, similar to the front shock absorber assembly 180, is well known in the art, and therefore will not be described in detail.

It should be noted that the upper end of the rear shock absorber assembly 196 is pivotally connected to the rear bracket 190 at a location different from the location where the rear end of the link rods 188 is pivotally connected to the rear bracket 190 such that forces applied to the respective rear shock absorber assembly 196 and the link rods 188 are substantially in opposite directions when the rear bracket 190 pivots. For example, the pins 192 and 198 are substantially, diametrically opposed about the shaft 168.

Figure 3:
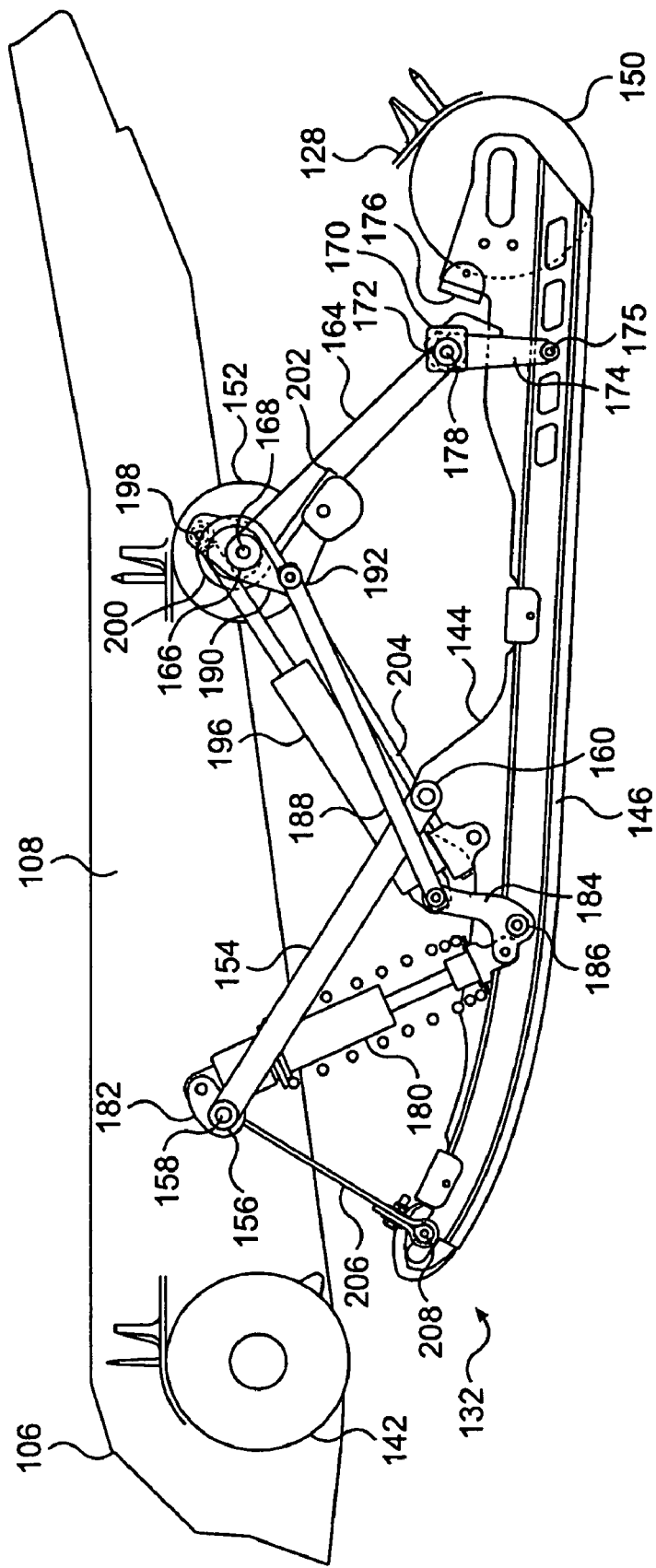
FIG. 3 is a schematic side elevational view of a rear suspension of a snowmobile according to the embodiment of the present invention of FIG. 1.
Figure 4:
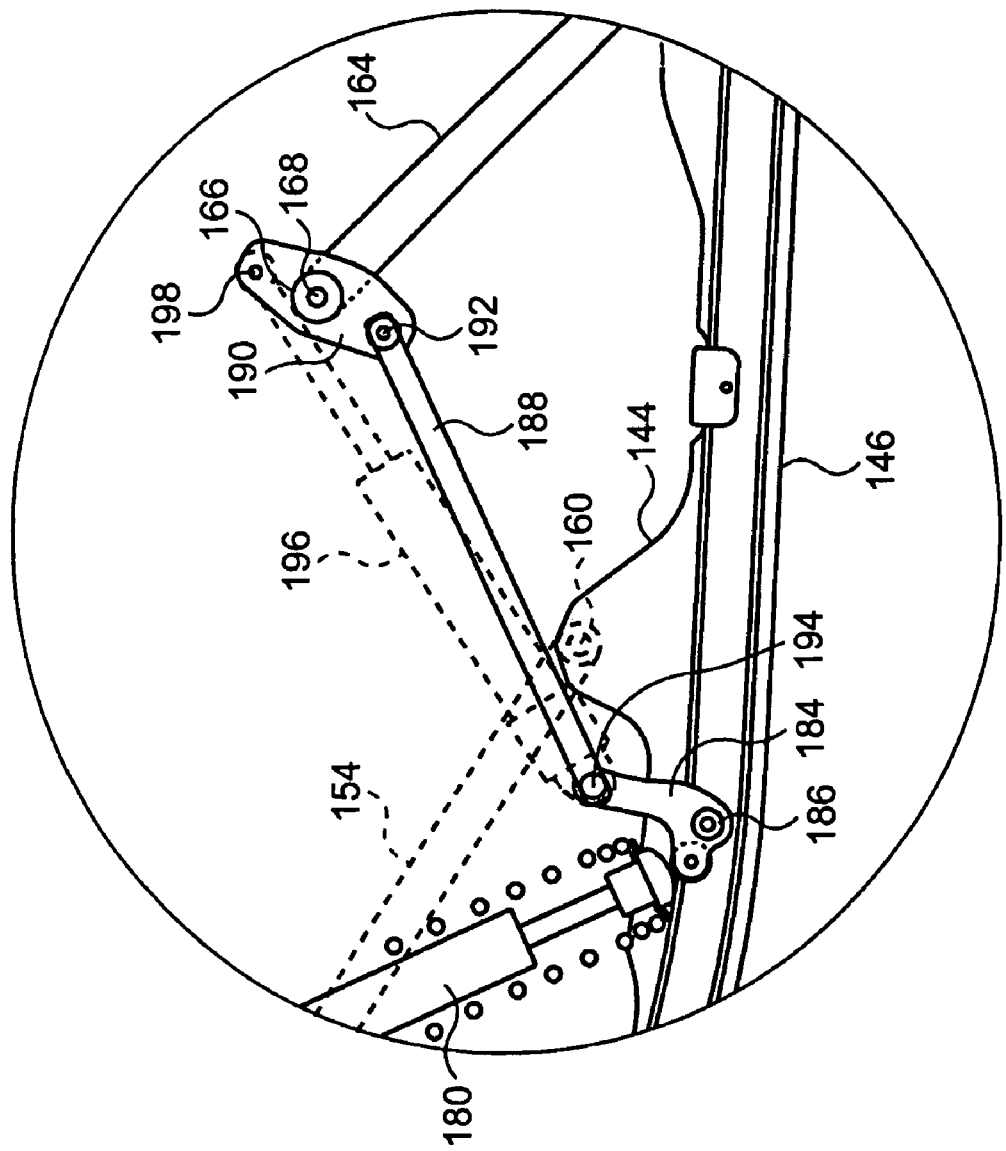
FIG. 4 is an enlarged portion of FIG. 3, showing a link assembly operatively connecting the front shock absorber assembly and the rear suspension arm.
Figure 7:
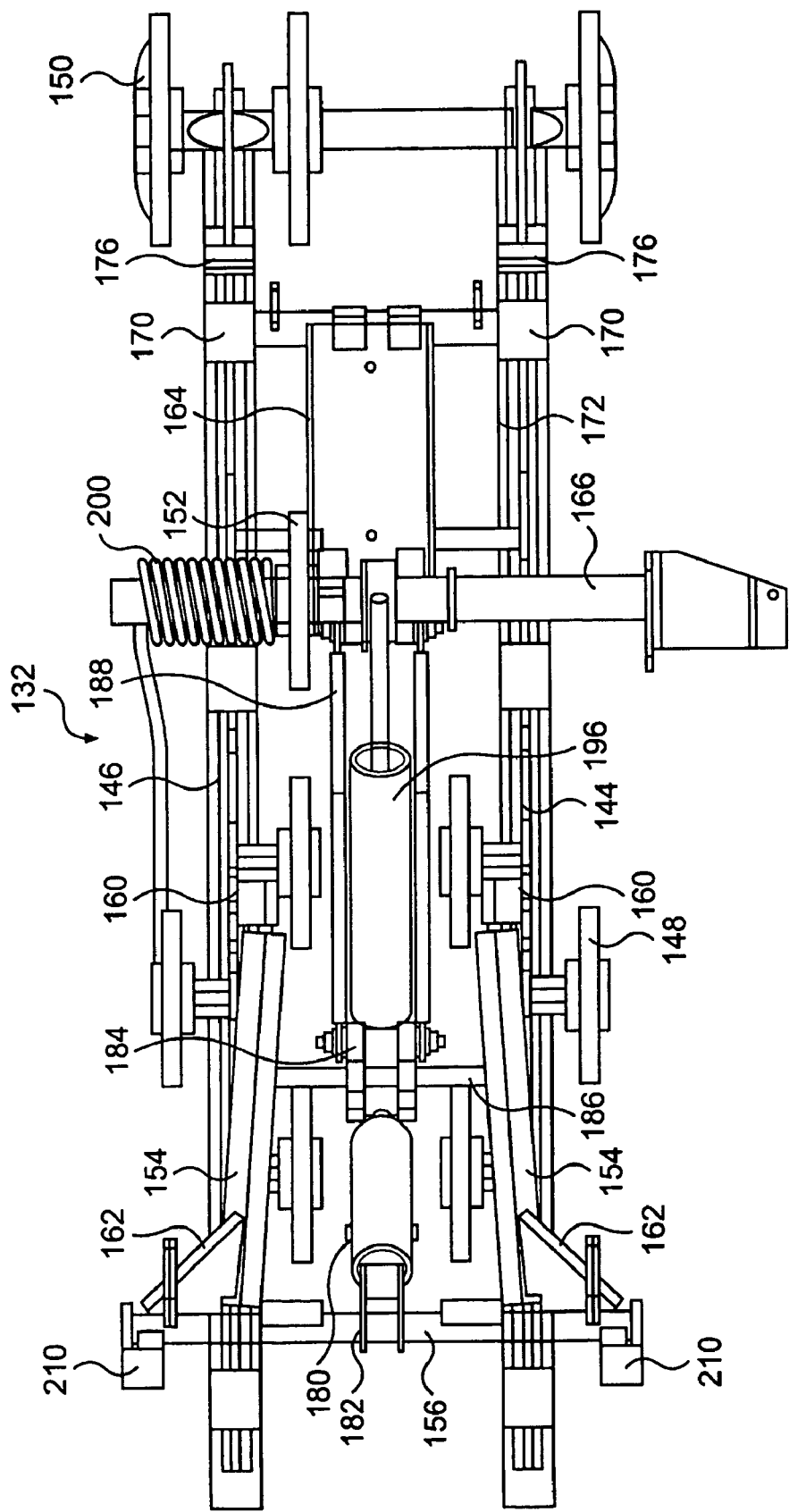
FIG. 7 is a top plan view of the rear suspension assembly of FIG. 3, with one of the top coil springs removed.

Referring to FIGS. 3 and 7, a torsion coil spring 200 is provided in order to push the slide frame assembly 144 apart from the rear tunnel 108 of the chassis 106, and to maintain the front and rear shock absorber assemblies 180, 196 substantially in extended condition when no substantial loads are applied thereon. The torsion coil spring 200 surrounds the tube 166 and is positioned at one end thereof. A first end 202 of the spring 200 is attached to the rear suspension arm 164, and a second end 204 thereof is attached to the slide frame assembly 144, under a preloaded condition so that a predetermined torsion of force is applied to the rear suspension arm 164, tending to pivot the rear suspension arm 164 about the shaft 168 away from the rear tunnel 108 of the chassis 106.

A second torsion coil spring (not shown) can be provided, surrounding the tube 166 and being positioned at the other end of the tube 166 in order to provide, in combination with the torsion coil spring 200, a symmetrical configuration to the rear suspension assembly 132.

A pair of flexible tension straps 206 are attached at their upper ends to the tube 156 which is supported by the shaft 158 to the rear tunnel 108 of the chassis 106, and are attached at their lower ends to the slide frame assembly 144 by means of a cross bar 208 which extends between and is attached at their opposed ends to the front ends of the slide rails 146. The flexible tension straps 206 prevent the slide frame assembly 144 from being pushed too far away from the rear tunnel 108 and thereby maintain the front and rear suspension arms 154, 164 in their respective predetermined angled positions while not intervening with the operation of the rear suspension assembly 132.

In an alternative arrangement, (see FIGS. 6 and 7) a pair of sleeve members 210 which are offset from the tube 156, are affixed, preferably by welding to the opposed ends of the tube 156. The shaft 158 of FIG. 3 can rotatably extend through the pair of sleeve members 210, rather than through the tube 156, and are attached at their opposed ends to the rear tunnel 108 of the chassis 106. In such an alternative arrangement, the rear suspension assembly 132 functions similarly as described above. In this case, the front bracket 182 and the tube 156 together pivot about the shaft received by the sleeve members 210 and thereby apply an axial force to the upper end of the front shock absorber assembly 180.

Figure 8:
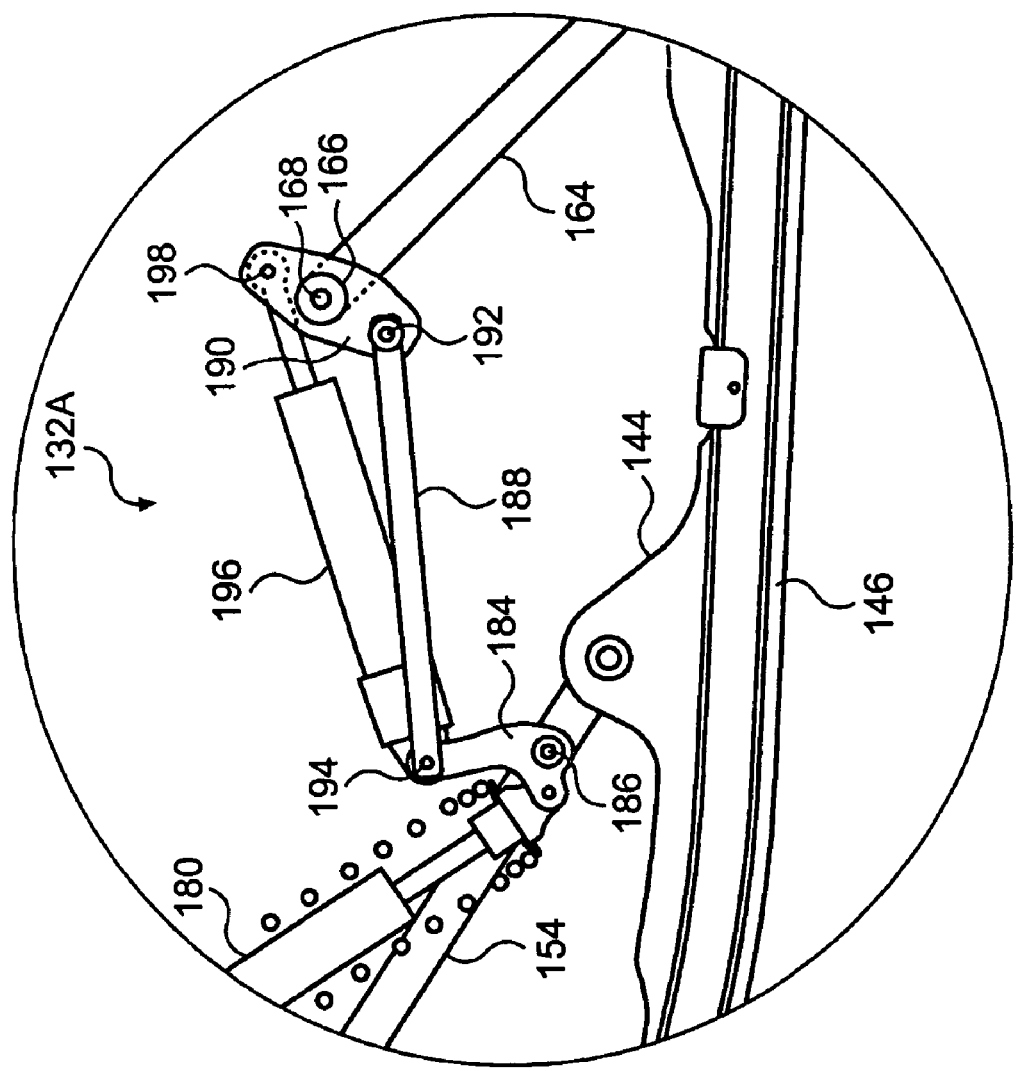
FIG. 8 is a partial side elevational view of a rear suspension assembly of a snowmobile according to another embodiment of the present invention.

Referring to FIG. 8 and in accordance with another embodiment of the present invention, a portion of a rear suspension assembly 132A is illustrated. In the rear suspension assembly 132A, the front rocker arm 184 is attached at its middle portion to the front suspension arms 154, rather than to the slide frame assembly 144 as shown in FIG. 3. In this embodiment, the cross bar 186 which pivotally connects the front rocker arm 184 extends between and is attached at their opposed ends to a lower portion of the respective front suspension arms 154. Other components are arranged similarly to the rear suspension assembly 132 of FIG. 3, and will not be redundantly described.

Figure 9:
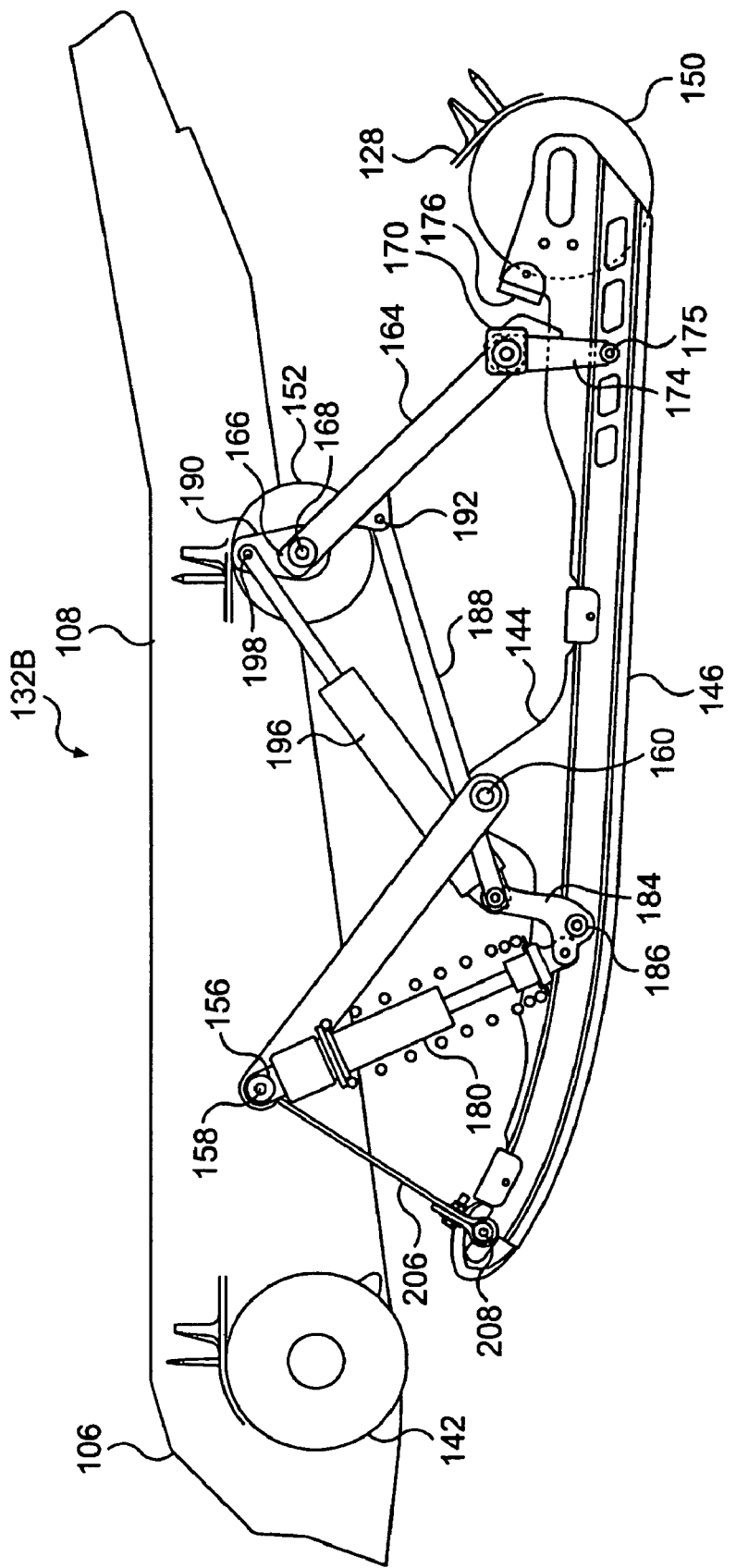
FIG. 9 is a schematic side elevational view of a rear suspension assembly of a snowmobile according to a further embodiment of the present invention.

Referring to FIG. 9 and in accordance with a further embodiment of the present invention, a rear suspension assembly 132B is similar to the rear suspension assembly 132 of FIG. 3. Similar components are indicated by similar numerals, and therefore will not be redundantly described. The difference between FIG. 3 and FIG. 9 is described as follows.

The front bracket 182 of FIG. 3 is omitted in FIG. 9, and therefore the upper end of the front shock absorber assembly 180 is directly attached to the tube 156 and is adapted to pivot about the shaft 158.

The pair of link rods 188 are pivotally attached at their rear ends to the rear suspension arm 146, preferably to the upper portion thereof, by the pin 192, rather than being pivotally attached to the rear bracket 190 as shown in FIG. 3.

The rear suspension assembly 132B according to this embodiment of the present invention functions similarly to the rear suspension assembly 132 of FIG. 3. The various alternative arrangements or embodiments of the present invention illustrated in FIGS. 8 and 9 are exemplary but not exhaustive, illustrating that the present invention can be implemented in various embodiments without departing from the principal of the present invention.

It should be further noted that the duplicated components in the embodiments as above described, such as the two front suspension arms, two link rods and the two torsion coil springs etc., are provided for the convenience of the assembly packaging. A snowmobile rear suspension assembly including only one of the each duplicated components will function similarly in an appropriately arranged configuration.

It should still further be noted that although the embodiments as above described illustrate a rear suspension assembly only having a rear to front coupling, the present invention is applicable to a rear suspension assembly that is not coupled, and is also applicable to a rear suspension assembly that is coupled both from rear to front and front to rear as disclosed in U.S. Pat. No. 6,206,124.

Modifications and improvements to the above-described embodiments of the present invention may become apparent to those skilled in the art. The foregoing description is intended to be exemplary rather than limiting. The scope of the invention is therefore intended to be limited solely by the scope of the appended claims.

What is claimed is:

1. A suspension assembly for a snowmobile having a chassis and an endless drive track, the suspension assembly comprising:
   front and rear suspension arms, each suspension arm having a first end and a second end, the first ends of the suspension arms being adapted to be pivotally connected to the chassis, the suspension arms adapted to extend downwardly and rearwardly from their connection to the chassis;
   a slide frame assembly pivotally connected to the second ends of the suspension arms, the slide frame assembly adapted to be urged downwardly into contact with the snowmobile endless drive track;
   a rear shock absorber operatively connected to the slide frame assembly for absorbing impact forces applied to the slide frame assembly; and
   a front shock absorber having a bottom end, the bottom end of the front shock absorber being operatively connected to the rear suspension arm such that the front shock absorber is actuated by pivotal movement of the rear suspension arm relative to the chassis.

2. The snowmobile suspension assembly as claimed in claim 1, wherein the operative connection between the front shock absorber and the rear suspension arm comprises, at least in part, a rocker arm movably connected to the bottom end of the front shock absorber.

3. The snowmobile suspension assembly as claimed in claim 2, wherein the operative connection between the front, shock absorber and the rear suspension arm further comprises, at least in part, a link rod pivotally connected at a first end thereof to the rocker arm and operatively connected at a second end thereof to the rear suspension and.

4. The snowmobile suspension assembly as claimed in claim 3, wherein:
   the rocker arm comprises a front end, a rear end, and a middle portion;
   the movable connection between the rocker arm and the lower end of the front shock absorber is a pivotal connection between the front end of the rocker arm and the lower end of the front shock absorber;
   the pivotal connection between the first end of the link rod and the rocker arm is a pivotal connection between the first end of the link rod and the rear end of the rocker arm; and
   the middle portion of the rocker arm is pivotally connected to the slide frame assembly.

5. The snowmobile suspension assembly as claimed in claim 3, wherein:
   the rocker arm comprises a front end, a rear end, and a middle portion;
   the movable connection between the rocker arm and the lower end of the front shock absorber is a pivotal connection between the front end of the rocker arm and the lower end of the front shock absorber;
   the pivotal connection between the first end of the link rod and the rocker arm is a pivotal connection between the first end of the link rod and the rear end of the rocker arm; and
   the middle portion of the rocker and is pivotally connected to a lower portion of the front suspension arm.

6. The snowmobile suspension assembly as claimed in claim 3, wherein the operative connection between the second end of the link rod and the rear suspension arm is a pivotal connection of the second end of the link rod to the rear suspension arm.

7. The snowmobile suspension assembly as claimed in claim 4, wherein the rear shock absorber has a first end, and the operative connection of the rear shock absorber to the slide frame assembly is, at least in part, a pivotal connection between the first end of the rear shock absorber and the rear end of the rocker arm.

8. The snowmobile suspension assembly as claimed in claim 7, wherein the rear shock absorber has a second end, and the second ends of the rear shock absorber and the link rod are pivotally connected to a rear bracket connected to the first end of the rear suspension arm, the pivotal connection between the second end of the link rod and the rear bracket being, at least in part, the operative connection between the second end of the link rod and the rear suspension arm.

9. The snowmobile suspension assembly as claimed in claim 5, wherein the rear shock absorber has a first end, and the operative connection of the rear shock absorber to the slide frame assembly is, at least in part, a pivotal connection between the first end of the rear shock absorber and the rear end of the rocker arm.

10. The snowmobile suspension assembly as claimed in claim 9, wherein the rear shock absorber has a second end, and the second ends of the rear shock absorber and the link rod are pivotally connected to a rear bracket connected to the first end of the rear suspension arm, the pivotal connection between the second end of the link rod and the rear bracket being, at least in part, the operative connection between the second end of the link rod and the rear suspension arm.

11. A snowmobile comprising:
a chassis including a tunnel;
an engine disposed on the chassis;
an endless drive track disposed below the tunnel and operatively connected to the engine for propulsion of the snowmobile;
two skis disposed on the frame, each via a front suspension;
a straddle seat disposed on the tunnel above the endless drive track and rearward of the engine;
a steering device disposed on the frame forward of the seat; and
a rear suspension assembly for supporting and tensioning the endless drive track, the rear suspension assembly including,
front and rear suspension arms, each suspension arm having a first end and a second end, the first ends of the suspension arms connected to the chassis, the suspension arms extending downwardly and rearwardly from their connection to the chassis;
a slide frame assembly pivotally connected to the second ends of the suspension arms, the slide frame assembly urged downwardly into contact with the snowmobile endless drive track;
a rear shock absorber operatively connected to the slide frame assembly for absorbing impact forces applied to the slide frame assembly; and
a front shock absorber having a bottom end, the bottom end of the front shock absorber being operatively connected to the rear suspension arm such that the front shock absorber is actuated by pivotal movement of the rear suspension arm relative to the chassis.

12. The snowmobile as claimed in claim 11, wherein the operative connection between the front shock absorber and the rear suspension arm comprises, at least in part, a rocker arm movably connected to the bottom end of the front shock absorber.

13. The snowmobile as claimed in claim 12, wherein the operative connection between the front shock absorber and the rear suspension arm further comprises, at least in part, a link rod pivotally connected at a first end thereof to the rocker arm and operatively connected at a second end thereof to the rear suspension arm.

14. The snowmobile as claimed in claim 13, wherein:
the rocker arm comprises a front end, a rear end, and a middle portion;
the movable connection between the rocker arm and the lower end of the front shock absorber is a pivotal connection between the front end of the rocker arm and the lower end of the front shock absorber;
the pivotal connection between the first end of the link rod and the rocker arm is a pivotal connection between the first end of the link rod and the rear end of the rocker arm; and
the middle position of the rocker arm is pivotally connected to the slide frame assembly.

15. The snowmobile as claimed in claim 13, wherein;
the rocker arm comprises a front end, a rear end, and a middle portion;
the movable connection between the rocker arm and the lower end of the front shock absorber is a pivotal connection between the front end of the rocker arm and the lower end of the front shock absorber;
the pivotal connection between the first end of the link rod and the rocker arm is a pivotal connection between the first end of the link rod and the rear end of the rocker arm; and
the middle portion of the rocker arm is pivotally connected to a lower portion of the front suspension arm.

16. The snowmobile as claimed in claim 13 wherein, wherein the operative connection between the second end of the link rod and the rear suspension arm is a pivotal connection of the second end of the link rod to the rear suspension arm.

17. The snowmobile as claimed in claim 14, the rear shock absorber has a first end, and the operative connection of the rear shock absorber to the slide frame assembly is, at least in part, a pivotal connection between the first end of the rear shock absorber and the rear end of the rocker arm.

18. The snowmobile as claimed in claim 17, wherein the rear shock absorber has a second end, and the second ends of the rear shock absorber and the link rod are pivotally connected to a rear bracket connected to the first end of the rear suspension arm, the pivotal connection between the second end of the link rod and the rear bracket being, at least in part, the operative connection between the second end of the link rod and the rear suspension arm.

19. The snowmobile as claimed in claim 15, wherein the rear shock absorber has a first end, and the operative connection of the rear shock absorber to the slide frame assembly is, at least in part, a pivotal connection between the first end of the rear shock absorber and the rear end of the rocker arm.

20. The snowmobile as claimed in claim 19, wherein the rear shock absorber has a second end, and the second ends of the rear shock absorber and the link rod are pivotally connected to a rear bracket connected to the first end of the rear suspension arm, the pivotal connection between the second end of the link rod and the rear bracket being, at least in part, the operative connection between the second end of the link rod and the rear suspension arm.

* * * * *